(12) United States Patent
Norloff et al.

(10) Patent No.: US 8,892,786 B2
(45) Date of Patent: Nov. 18, 2014

(54) SYSTEMS AND METHODS FOR PROVIDING A WIRELESS COMPUTER CONTROL LINK

(71) Applicant: LC Technologies, Inc., Fairfax, VA (US)

(72) Inventors: Peter L. Norloff, Oakton, VA (US); Raymond D. Kester, Fairfax Station, VA (US)

(73) Assignee: LC Technologies, Inc., Fairfax, VA (US)

( * ) Notice: Subject to any disclaimer, the term of this patent is extended or adjusted under 35 U.S.C. 154(b) by 14 days.

(21) Appl. No.: 13/755,721

(22) Filed: Jan. 31, 2013

(65) Prior Publication Data

US 2014/0215099 A1    Jul. 31, 2014

(51) Int. Cl.
  G06F 3/00 (2006.01)
  G06F 13/38 (2006.01)
  G06F 15/16 (2006.01)
  H04W 76/02 (2009.01)

(52) U.S. Cl.
  CPC .................................... H04W 76/02 (2013.01)
  USPC ................ 710/15; 710/62; 709/203; 709/217

(58) Field of Classification Search
  None
  See application file for complete search history.

(56) References Cited

U.S. PATENT DOCUMENTS

| | | | |
|---|---|---|---|
| 7,436,300 B2* | 10/2008 | Glass et al. | 340/568.1 |
| 7,577,910 B1* | 8/2009 | Husemann et al. | 715/744 |
| 7,809,332 B1* | 10/2010 | Kammer | 455/41.2 |
| 2005/0120375 A1* | 6/2005 | Elms | 725/81 |
| 2005/0240692 A1* | 10/2005 | Li | 710/62 |
| 2006/0094461 A1* | 5/2006 | Hameed et al. | 455/552.1 |
| 2012/0180025 A1* | 7/2012 | Webb | 717/114 |
| 2012/0194418 A1* | 8/2012 | Osterhout et al. | 345/156 |
| 2013/0090060 A1* | 4/2013 | Kim | 455/41.2 |
| 2013/0110958 A1* | 5/2013 | Kao et al. | 709/208 |

OTHER PUBLICATIONS

"Portable App". What is a portable appl—Definition from WhatIs. com. Definition last updated May 2012. Available: http://searchcloudapplications.techtarget.com/definition/portable-app-portable-application.*

"Portable Application". Wikipedia, the free encyclopedia. View on Apr. 2, 2014. Available: http://en.wikipedia.org/wiki/Portable_application.*

* cited by examiner

*Primary Examiner* — Michael Sun (74) *Attorney, Agent, or Firm* — John R. Kasha; Kelly L. Kasha; Kasha Law LLC (57) ABSTRACT

Systems and methods are provided for wirelessly controlling a client computer system from a host computer system. A HID class command is received from a host computer system that is generated by an application executing on the host computer system in order to control a client computer system using a first wireless transceiver device that connects to a USB port of the host computer system. The HID class command is transmitted across a wireless channel using the first wireless transceiver device. The HID class command is received from the wireless channel using a second wireless transceiver device that is connected to a USB port of the client computer system and is configured by the client computer system as a HID. The HID class command is sent to the client computer system in order to control the client computer system using the second wireless transceiver device.

20 Claims, 7 Drawing Sheets

352
EXAMPLE COMMAND STRUCTURE-MOUSE

| PACKET(0) | 0X30 | COMMAND | MOUSE DATA FOLLOWS |
|---|---|---|---|
| PACKET(1) | 0X00 | BUTTONS | BUTTON CLICK |
| PACKET(2) | 0X04 | X-VECTOR | RELATIVE MOVEMENT |
| PACKET(3) | 0X08 | Y-VECTOR | RELATIVE MOVEMENT |

EXAMPLE COMMAND STRUCTURE-KEYBOARD

| PACKET(0) | 0X40 | COMMAND | KEYBOARD DATA |
|---|---|---|---|
| PACKET(1) | 0X04 | KEY CODE | VALUE FOR _>'A' |
| PACKET(2) | 0X02 | KEY MOD | SIMULATE SHIFT_>'A' |
| PACKET(3) | 0X00 | FUTURE | N/U |
| PACKET(4) | 0X00 | FUTURE | N/U |

USE STANDARD HID SPECIFICATION FOR DATA

370 →

372
EXAMPLE COMMAND STRUCTURE VIA RF LINK FOR MOUSE

| PACKET(0) | 0X30 | COMMAND | MOUSE DATA FOLLOWS |
|---|---|---|---|
| PACKET(1) | 0X00 | BUTTONS | BUTTON CLICK |
| PACKET(2) | 0X04 | X-VECTOR | RELATIVE MOVEMENT |
| PACKET(3) | 0X08 | Y-VECTOR | RELATIVE MOVEMENT |
| PACKET(4) | 0X3C | CHECKSUM | CHECKSUM |

SYSTEMS AND METHODS FOR PROVIDING A WIRELESS COMPUTER CONTROL LINK

INTRODUCTION

Eye tracking systems have been used for a long time to help people with disabilities control a computer. Since early personal computer (PC) operating systems did not allow multitasking, the software used for eye tracking was executed on a host PC dedicated to eye tracking. This dedicated host PC was then used to control another client PC, using commands generated by the eye tracking system.

An exemplary method of controlling a client computer from a host computer executing eye tracking software involved a wired connection. A cable was connected between the RS-232 serial ports of the host PC and the client PC. The eye tracking software on the host PC generated commands for the client PC. These commands were sent serially across the RS-232 cable to the client PC. Software on the client PC monitored the serial port and used the commands received to control the client PC.

Although most modern PCs now include multitasking operating systems, a method for controlling a client computer system from a host computer system still has advantages, particularly for applications like eye tracking. For example, eye tracking software used by people with disabilities generally requires a large area of the display screen for letter and command selection. Running this software on the same PC with an application the user would like to control can significantly add to the complexity of installing and using the eye tracking software.

In addition, running the host and client software on different PCs increases the stability and flexibility of the host software. Generally, if the host software is run on a separate PC, it is less vulnerable to conflicts from the client software or attacks from malicious software that the client PC has obtained. Also, running the host software on a separate PC allows a user to move more easily between different client applications residing on different client PCs. For example, each time a person with a disability wants to use an application on a different PC, they do not need to reinstall the entire eye tracking software.

Unfortunately, however, most modern PCs no longer have RS-232 serial ports. Consequently, methods for controlling a client computer from a host computer, like the method described above, no longer work, or no longer work without considerable modification. As a result, new systems and methods for controlling a client computer from a host computer are needed.

SUMMARY

A system is disclosed for wirelessly controlling a client computer system from a host computer system. The system includes a first wireless transceiver device and a second wireless transceiver device. The first wireless transceiver device connects to a universal serial bus (USB) port of the host computer system. The first wireless transceiver device is configured by the host computer system as a human interface device (HID). The first wireless transceiver device receives a HID class command from the host computer system. The HID class command is generated by an application executing on the host computer system in order to control a client computer system. The first wireless transceiver device transmits the HID class command across a wireless channel.

The second wireless transceiver device connects to a USB port of the client computer system. The second wireless transceiver device is configured by the client computer system as a HID. The second wireless transceiver device receives the HID class command from the wireless channel. The second wireless transceiver device sends the HID class command to the client computer system in order to control the client computer system. The control of the client computer system is performed without storing or executing any software on client computer system that is specific to the second wireless transceiver device or the application executing on the host computer system.

A method is disclosed for wirelessly controlling a client computer system from a host computer system. A HID class command is received from a host computer system using a first wireless transceiver device. The HID class command is generated by an application executing on the host computer system in order to control a client computer system. The first wireless transceiver device connects to a USB port of the host computer system and is configured by the host computer system as an HID. The HID class command is transmitted across a wireless channel using the first wireless transceiver device.

The HID class command is received from the wireless channel using a second wireless transceiver device. The second wireless transceiver device is connected to a USB port of the client computer system and is configured by the client computer system as a HID. The HID class command is sent to the client computer system in order to control the client computer system using the second wireless transceiver device. The client computer system is controlled without storing or executing any software on the client computer system specific to the second wireless transceiver device or the application executing on the host computer system.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 1:
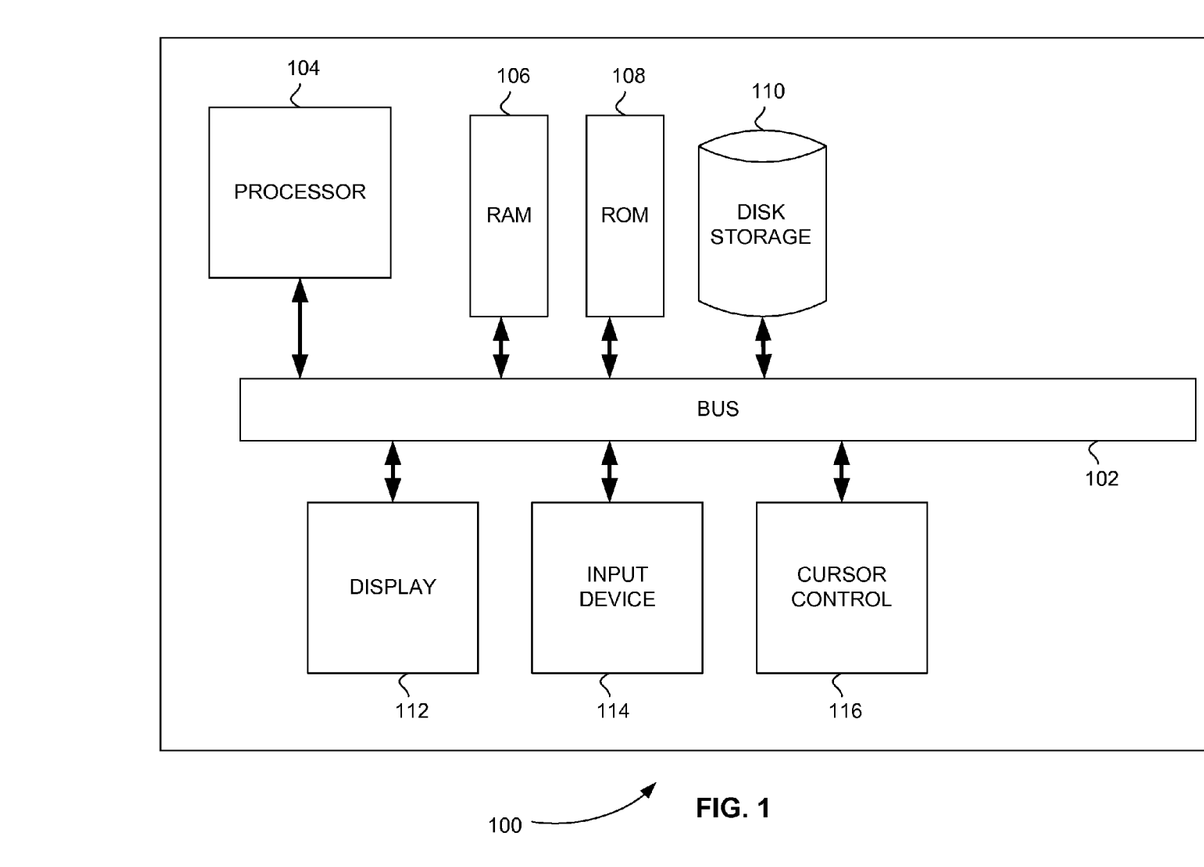
FIG. 1 is a block diagram that illustrates a computer system, in accordance with various embodiments.

FIG. 1 is a block diagram that illustrates a computer system 100, in accordance with various embodiments. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Memory 106 may include, for example, flash memory. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Systems and Methods for Wirelessly Controlling a Client Computer System from a Host Computer System As described above, although most modern personal computers (PCs) now include multitasking operating systems, methods and systems for controlling a client computer from a host computer still have advantages, particularly for applications like eye tracking. For example, running the host and client software on different PCs increases the stability and flexibility of the host software. Unfortunately, however, most modern PCs no longer support systems and methods based on the RS-232 standard. Consequently, methods for controlling a client computer from a host computer, like the method described above, no longer work, or no longer work without considerable modification. As a result, new systems and methods for controlling a client computer from a host computer are needed.

In various embodiments, systems and methods are provided for controlling a client computer system from a host computer system by emulating the universal serial bus (USB) human interface device (HID) class standard over a wireless connection. For example, an eye tracking system executing on a host PC determines that a user wants to send a keystroke "K" to a client computer. The eye tracking system packages the keystroke "K" into an HID class packet and sends it through a USB port to a radio frequency (RF) transmitter. The HID class is the class that defines keyboard and mouse commands, for example. As a result, the host PC may be sending a keyboard command or mouse command to the client computer. The HID class command may also be referred to as command, HID class, HID class data, or HID class packet.

A similar RF receiver plugged into the port of a client PC receives the HID class packet for the keystroke "K." An Eyegaze Edge link device of the client PC recognizes the HID class packet as a keyboard command and places the keystroke "K" in the application currently executing. In other words, without any special software installed on the client PC, the Eyegaze Edge link device of the client PC recognizes HID class commands from the host PC.

Figure 2:
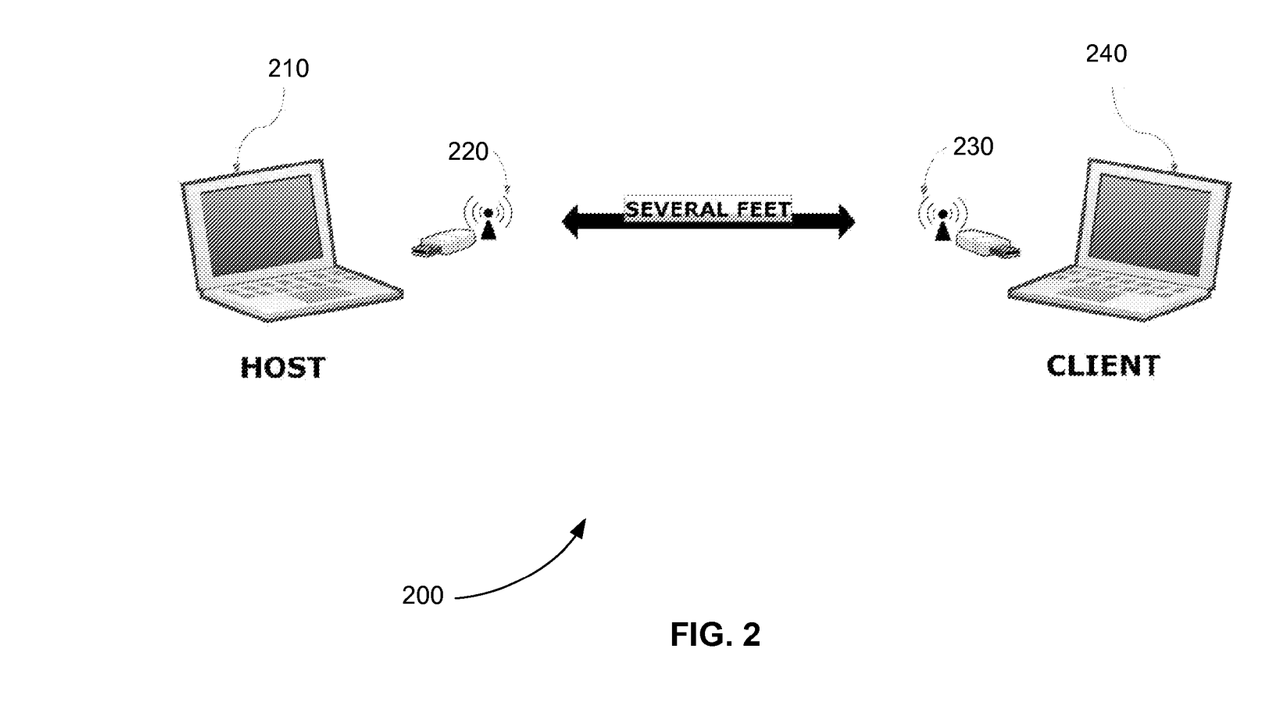
FIG. 2 is schematic diagram of a system for wirelessly controlling a client computer system from a host computer system, in accordance with various embodiments.

FIG. 2 is schematic diagram of a system 200 for wirelessly controlling a client computer system 240 from a host computer system 210, in accordance with various embodiments. System 200 includes wireless transceiver device 220 and wireless transceiver device 230. Wireless transceiver device 220 is coupled to a USB port of host computer system 210, and wireless transceiver device 230 is coupled to a USB port of client computer system 240. Wireless transceiver device 220 and wireless transceiver device 230 are used to wirelessly transmit HID class commands from host computer system 210 to client computer system 240.

One exemplary eye tracking system for people with disabilities from LC Technologies, Inc. is called Eyegaze Edge®. Eyegaze Edge® is an eye-operated communication and control system that empowers people with disabilities to communicate and interact with the world around them. With Eyegaze Edge®, a person can speak, write, interface with a PC, use the Internet, and even control systems in the home or office. Eyegaze Edge®, for example, is executed on host computer system 210.

In various embodiments, wireless transceiver device 220 and wireless transceiver device 230 can include the same hardware and can be used interchangeably with host computer system 210 or client computer system 240. In other words, both wireless transceiver device 220 and wireless transceiver device 230 can be used as a receiver or transmitter. Using common hardware reduces the overall cost of system 200, for example. When used with Eyegaze Edge®, for example, wireless transceiver device 220 and wireless transceiver device 230 are referred to as an Eyegaze Edge link device. Eyegaze Edge® is used in connection with various embodiments of the methods and systems for illustration. One skilled in the art will appreciate that any type of eye tracking system can be used.

Figure 3A:
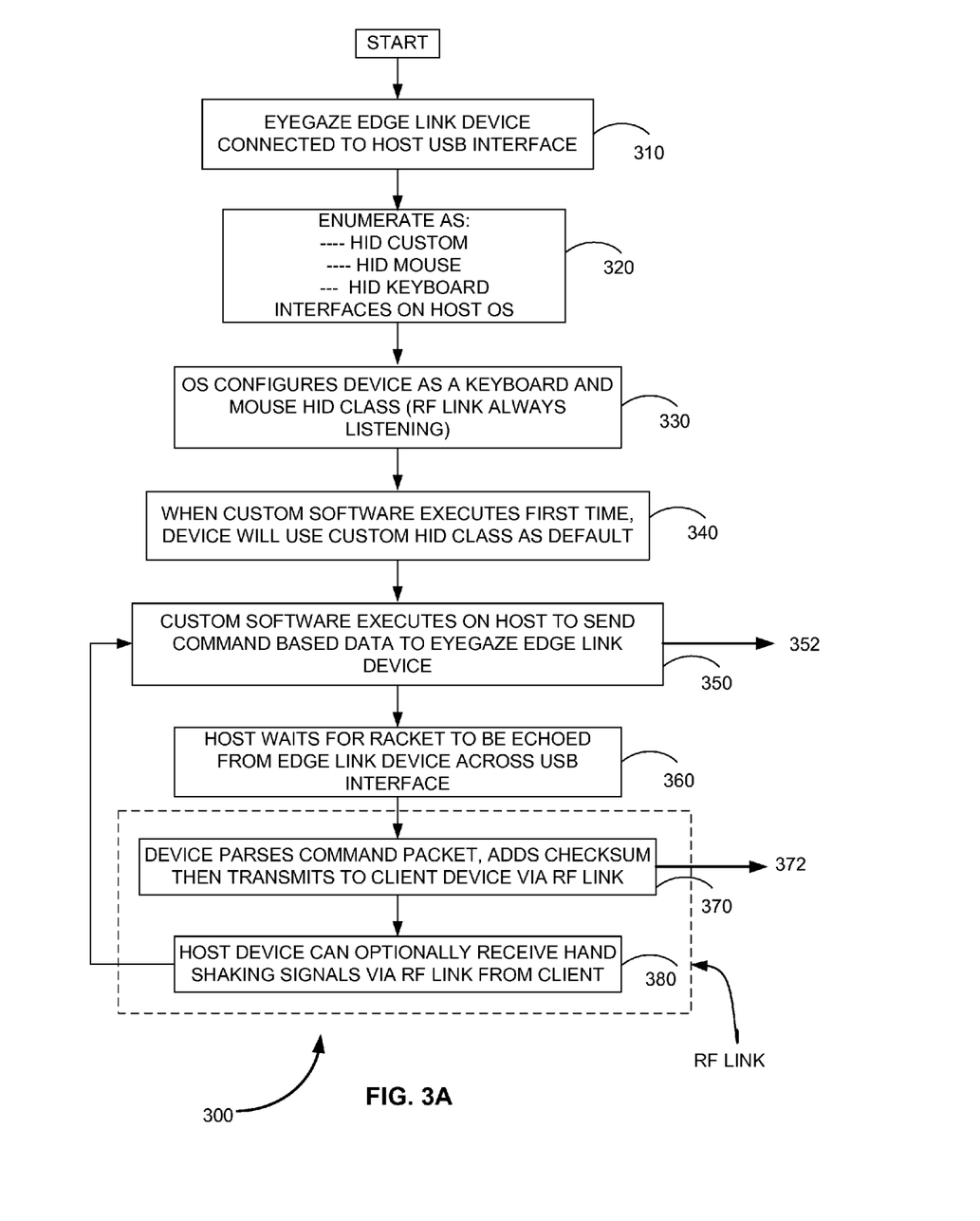
FIGS. 3A and 3B illustrate a flowchart showing a method for configuring and using an Eyegaze Edge link device on a host computer system, in accordance with various embodiments.
Figure 3B:
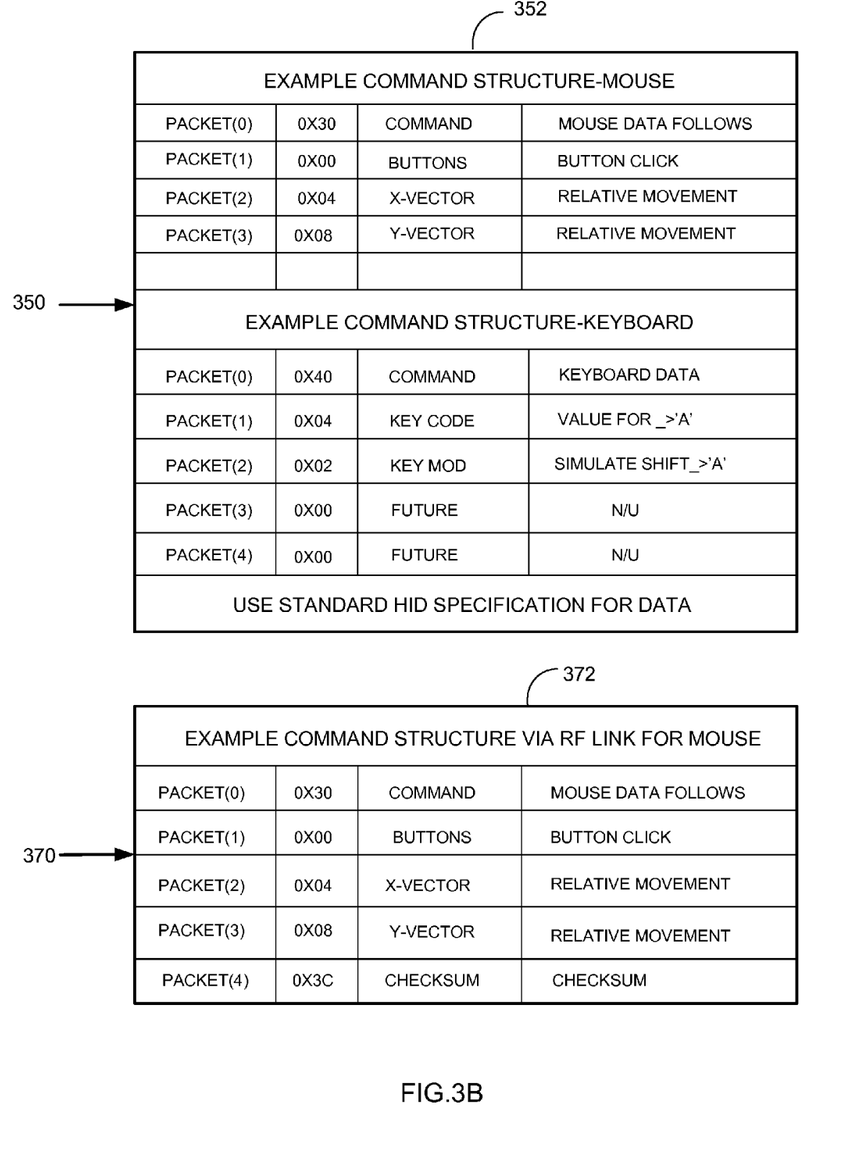

FIGS. 3A and 3B illustrate a flowchart showing a method 300 for configuring and using an Eyegaze Edge link device on a host computer system, in accordance with various embodiments.

Referring to FIG. 3A, in step 310 of method 300, an Eyegaze Edge link device is connected to a host computer system using a USB interface.

In step 320, HID classes are enumerated as HID custom, HID mouse, and HID keyboard interfaces on a host computer system's operating system.

In step 330, the operating system of the host computer system configures the Eyegaze Edge link device as keyboard and mouse HID class.

In step 340, when custom software on the host computer system executes for the first time, the Eyegaze Edge link device uses the custom HID class by default where it becomes a transmitter. Custom software on the host computer system is the Eyegaze Edge® system, for example.

In step 350, the custom software on the host computer system send command based data to the Eyegaze Edge link device. Command based data can also be referred to as HID class data. Block 352, shown in detail in FIG. 3B, is a table including exemplary command structure for mouse and exemplary command structure for keyboard.

In step 360, the host computer system waits for a packet to be echoed from the Eyegaze Edge link device across the USB interface.

In step 370, in response to the custom software command, the Eyegaze Edge link device parses the command packet, adds checksum, and then transmits to the client Eyegaze Edge link device via the RF link. Block 372, shown in detail in FIG. 3B, is a table including exemplary command structure via the RF link for mouse.

In step 380, the Eyegaze Edge link device optionally receives handshaking signals from the client Eyegaze Edge link device via the RF link.

Figure 4A:
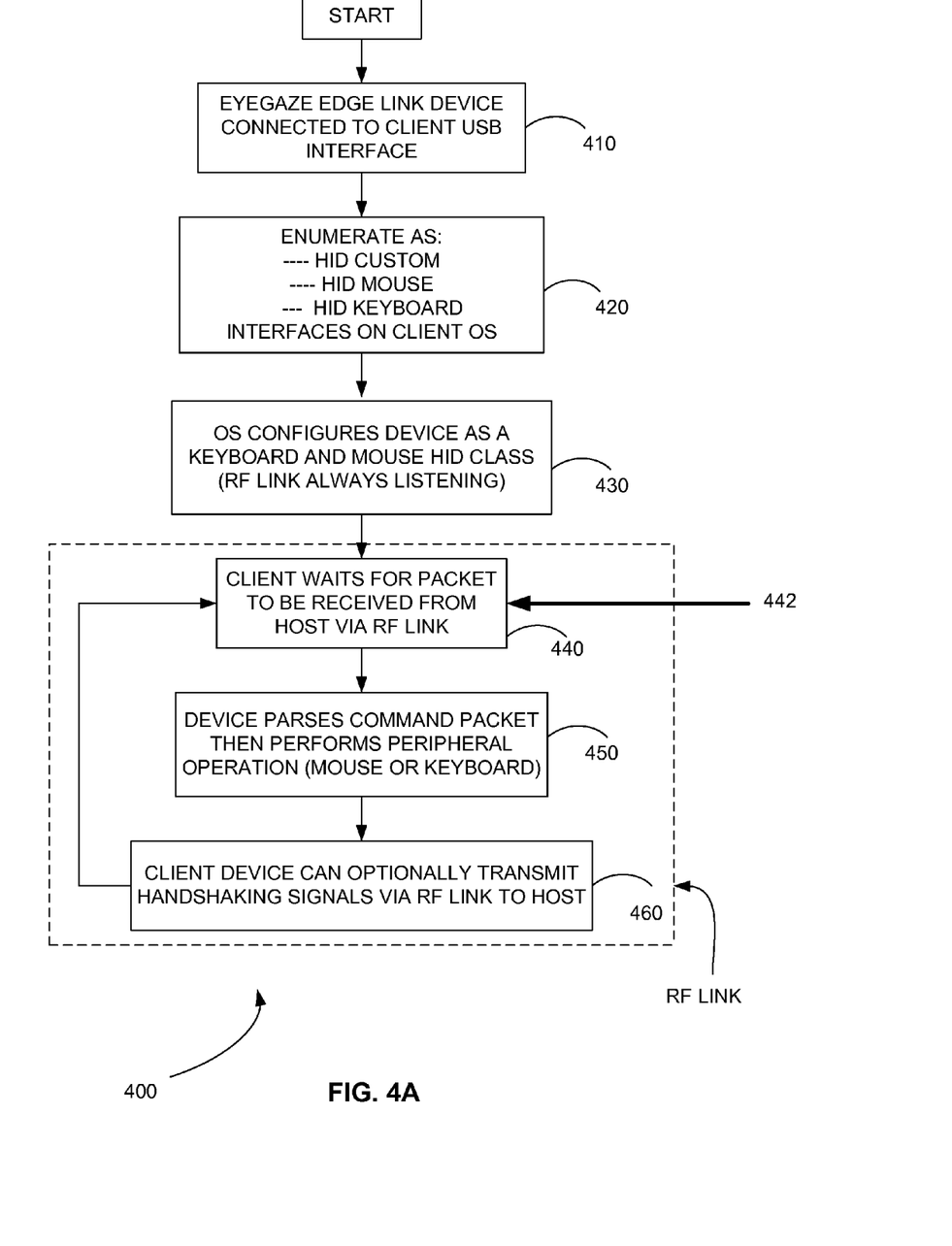
FIGS. 4A and 4B illustrate a flowchart showing a method for configuring and using an Eyegaze Edge link device on a client computer system, in accordance with various embodiments.
Figure 4B:
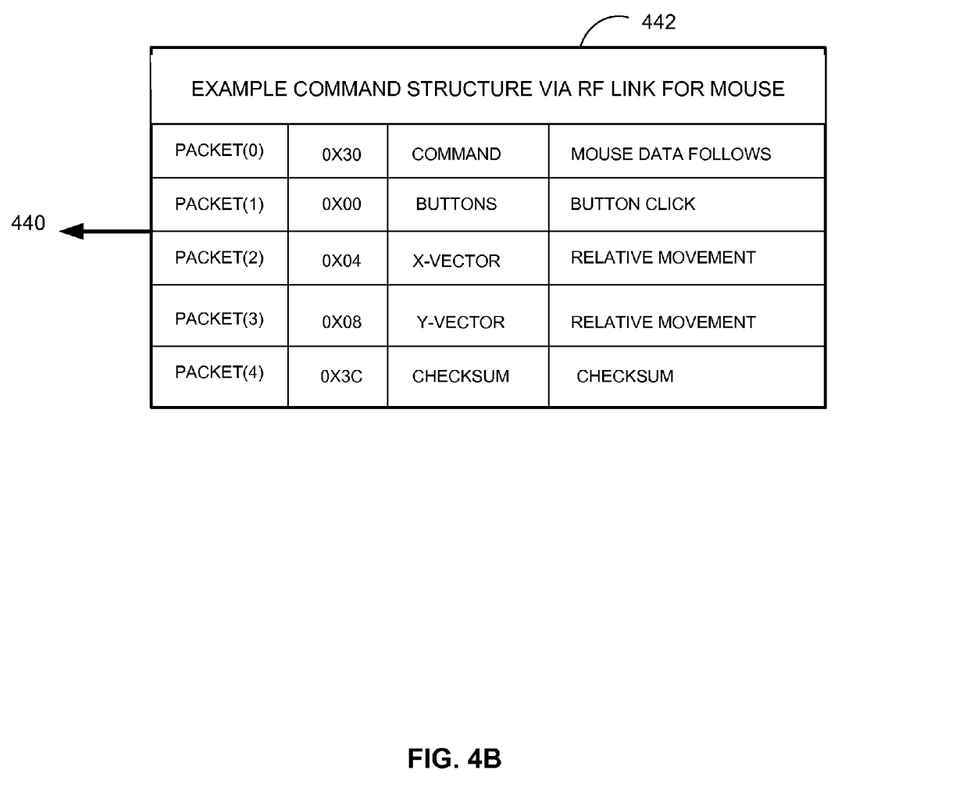

FIGS. 4A and 4B illustrate a flowchart showing a method 400 for configuring and using an Eyegaze Edge link device on a client computer system, in accordance with various embodiments.

Referring to FIG. 4A, in step 410 of method 400, an Eyegaze Edge link device is connected to a client computer system using a USB interface.

In step 420, HID classes are enumerated as HID custom, HID mouse, and HID keyboard interfaces on a client computer's operating system.

In step 430, the operating system of the client computer system configures the Eyegaze Edge link device as keyboard and mouse HID class.

In step 440, the Eyegaze Edge link device waits for a packet from the host Eyegaze Edge link device via the RF link. Block 442, shown in detail in FIG. 4B, is a table including exemplary command structure via the RF link for mouse.

In step 450, the Eyegaze Edge link device parses the received packet and then performs the peripheral operation.

In step 460, the Eyegaze Edge link device optionally transmits handshaking signals to the host Eyegaze Edge link device via the RF link.

Although the examples described above and in FIGS. 2-4 are directed to eye tracking systems, the systems and methods described herein are not limited to eye tracking systems. The systems and methods described herein apply to any application for controlling a client computer system from a host computer system.

System for Controlling a Client Computer System from a Host Computer System

Returning to FIG. 2, system 200 is a system for wirelessly controlling a client computer system 240 from a host computer system 210. As described above, system 200 includes wireless transceiver device 220 and wireless transceiver device 230. Wireless transceiver device 220 and wireless transceiver device 230 are similar in form factor to a USB thumb drive or dongle, for example. Wireless transceiver device 220 and wireless transceiver device 230 include substantially the same hardware, in order to reduce cost. Wireless transceiver device 220 and wireless transceiver device 230 can be radio frequency (RF) transceiver devices, for example.

Host computer system 210 can include, but is not limited to, a computer system, such as is shown in FIG. 1, a smartphone, a personal computer (PC), a laptop computer, a tablet computer, a gaming device, a control unit of an automobile, or any device capable of processing data, sending and receiving control signals, and recognizing HID class devices. Similarly, client computer system 240 can include, but is not limited to, a computer system, such as is shown in FIG. 1, a smartphone, a personal computer (PC), a laptop computer, a tablet computer, a gaming device, a control unit of an automobile, or any device capable of processing data, sending and receiving control signals, and recognizing HID class devices.

Wireless transceiver device 220 connects to a USB port of host computer system 210. Wireless transceiver device 220 is configured by host computer system 210 as a HID. Wireless transceiver device 220 receives a HID class command from host computer system 210. A HID class command is, for example, a command that conforms to the USB HID class specification. Specifically, an application executing on host computer system 210 generates HID class data in order to control client computer system 240. The application executing on host computer system 210 is an eye tracking application, for example. The HID class data is sent from host computer system 210 to client computer system 240 via the custom HID interface. The Eyegaze Edge link device converts the HID class data into a HID class command after parsing the command bytes, so that the firmware on client computer system 240 knows to which custom HID interface the HID class data should be sent.

Wireless transceiver device 220 transmits the HID class command across a wireless channel. The wireless channel can be an RF channel, for example. In various embodiments, the RF channel can include an industrial, scientific, and medical (ISM) radio band.

Wireless transceiver device 230 connects to a USB port of client computer system 240. Wireless transceiver device 230 is configured by client computer system 240 as a HID. Wireless transceiver device 230 receives the HID class command from the wireless channel. Wireless transceiver device 230 sends the HID class command to client computer system 240 in order to control client computer system 240. The control of client computer system 240 is performed without storing or executing any software on client computer system 240 that is specific to wireless transceiver device 230 or the application executing on host computer system 210. No additional software is required on client computer system 240, because client computer system 240 recognizes HID class commands.

In various embodiments, the HID class command can be a keyboard command, a mouse command, or a custom command.

In various embodiments, system 200 can include one or more additional wireless transceiver devices (not shown) connected to a USB port of one or more additional client computers (not shown). Each of the one or more additional wireless transceiver devices can receive the HID class command from the wireless channel.

In various embodiments, host computer system 210 can selectively control one or more client computer systems. For example, wireless transceiver device 230 and the one or more additional wireless transceiver devices can have unique identifiers (IDs). The HID class command can then include one or more IDs in order to selectively control the one or more client computer systems.

Method for Controlling a Client Computer System from a Host Computer System

Figure 5:
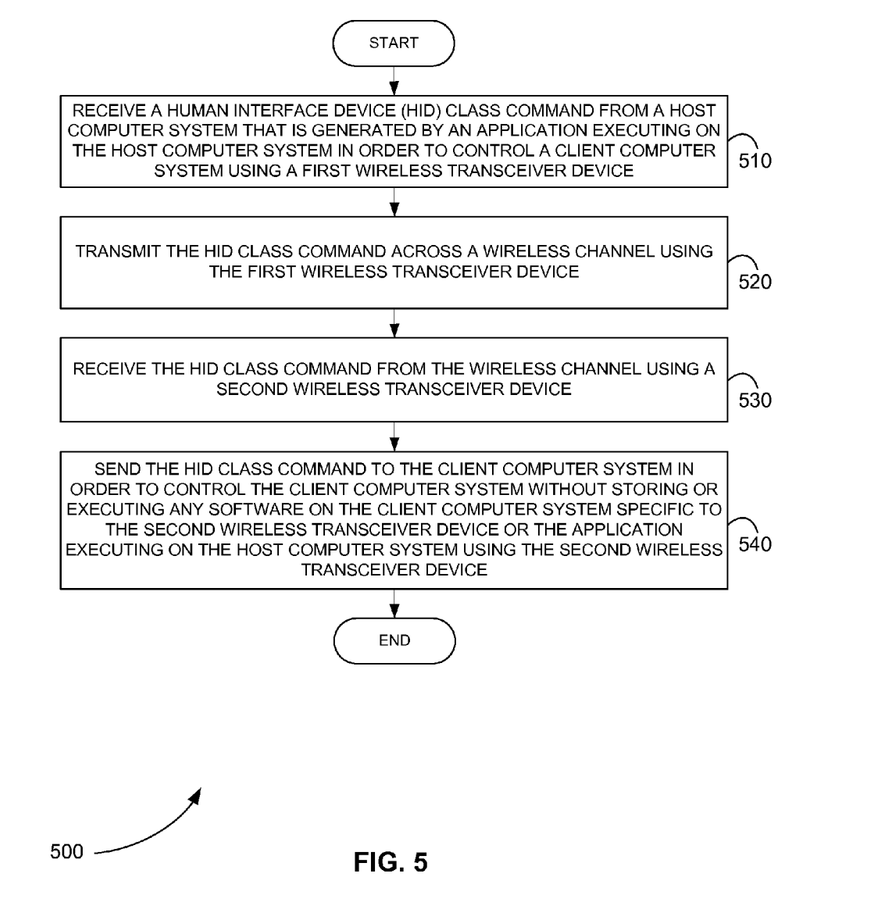
FIG. 5 is an exemplary flowchart showing a method for wirelessly controlling a client computer system from a host computer system.

FIG. 5 is an exemplary flowchart showing a method 500 for wirelessly controlling a client computer system from a host computer system.

In step 510 of method 500, a human interface device (HID) class command is received from a host computer system using a first wireless transceiver device. The HID class command is generated by an application executing on the host computer system in order to control a client computer system. The first wireless transceiver device connects to a universal serial bus (USB) port of the host computer system and is configured by the host computer system as an HID.

In step 520, the HID class command is transmitted across a wireless channel using the first wireless transceiver device.

In step 530, the HID class command is received from the wireless channel using a second wireless transceiver device. The second wireless transceiver device is connected to a USB port of the client computer system and is configured by the client computer system as a HID.

In step 540, the HID class command is sent to the client computer system in order to control the client computer system using the second wireless transceiver device. The client computer system is controlled without storing or executing any software on the client computer system specific to the second wireless transceiver device or the application executing on the host computer system.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for wirelessly controlling a client computer system from a host computer system, comprising:
   a first wireless transceiver device that connects to a universal serial bus (USB) port of a host computer system, that is configured by the host computer system as a human interface device (HID), that receives a HID class command from the host computer system that is generated by an application executing on the host computer system in order to control a client computer system, and that transmits the HID class command across a wireless channel; and
   a second wireless transceiver device that connects to a USB port of the client computer system, that is configured by the client computer system as a HID, that receives the HID class command from the wireless channel, that sends the HID class command to the client computer system in order to control the client computer system without storing or executing any software on the client computer system specific to the second wireless transceiver device or the application executing on the host computer system.

2. The system of claim 1, wherein the first wireless transceiver device and the second wireless transceiver device comprise the same hardware.

3. The system of claim 1, wherein the first wireless transceiver device comprises a first radio frequency (RF) transceiver device, the second wireless transceiver device comprises a second RF transceiver device, and the wireless channel comprises an RF wireless channel.

4. The system of claim 3, wherein the RF wireless channel comprises an industrial, scientific, and medical (ISM) radio band.

5. The system of claim 1, wherein the application executing on the host computer system comprises an eye tracking application.

6. The system of claim 1, wherein the HID class command comprises a keyboard command.

7. The system of claim 1, wherein the HID class command comprises a mouse command.

8. The system of claim 1, wherein the HID class command comprises a custom command.

9. The system of claim 1, further comprising one or more additional wireless transceiver devices connected to a USB port of one or more additional client computers that receive the HID class command from the wireless channel.

10. The system of claim 9, wherein the second wireless transceiver device and the one or more additional wireless transceiver devices have unique identifiers (IDs) and the HID class command includes one or more IDs in order to selectively control one or more client computer systems.

11. A method for wirelessly controlling a client computer system from a host computer system, comprising:
receiving a human interface device (HID) class command from a host computer system that is generated by an application executing on the host computer system in order to control a client computer system using a first wireless transceiver device, wherein the first wireless transceiver device connects to a universal serial bus (USB) port of the host computer system and is configured by the host computer system as an HID;
transmitting the HID class command across a wireless channel using the first wireless transceiver device;
receiving the HID class command from the wireless channel using a second wireless transceiver device, wherein the second wireless transceiver device is connected to a USB port of the client computer system and is configured by the client computer system as a HID; and
sending the HID class command to the client computer system in order to control the client computer system without storing or executing any software on the client computer system specific to the second wireless transceiver device or the application executing on the host computer system using the second wireless transceiver device.

12. The method of claim 11, wherein the first wireless transceiver device and the second wireless transceiver device comprise the same hardware.

13. The method of claim 11, wherein the first wireless transceiver device comprises a first radio frequency (RF) transceiver device, the second wireless transceiver device comprises a second RF transceiver device, and the wireless channel comprises an RF wireless channel.

14. The method of claim 13, wherein the RF wireless channel comprises an industrial, scientific, and medical (ISM) radio band.

15. The method of claim 11, wherein the application executing on the host computer system comprises an eye tracking application.

16. The method of claim 11, wherein the HID class command comprises a keyboard command.

17. The method of claim 11, wherein the HID class command comprises a mouse command.

18. The method of claim 11, wherein the HID class command comprises a custom command.

19. The method of claim 11, further comprising receiving the HID class command from the wireless channel using one or more additional wireless transceiver devices, wherein the one or more additional wireless transceiver devices are connected to a USB port of one or more additional client computers.

20. The method of claim 19, wherein the second wireless transceiver device and the one or more additional wireless transceiver devices have unique identifiers (IDs) and the HID class command includes one or more IDs in order to selectively control one or more client computer systems.

* * * * *